Sept. 16, 1952      R. L. HOLTON      2,610,356
GAME SKINNING RACK
Filed Sept. 20, 1949      2 SHEETS—SHEET 2
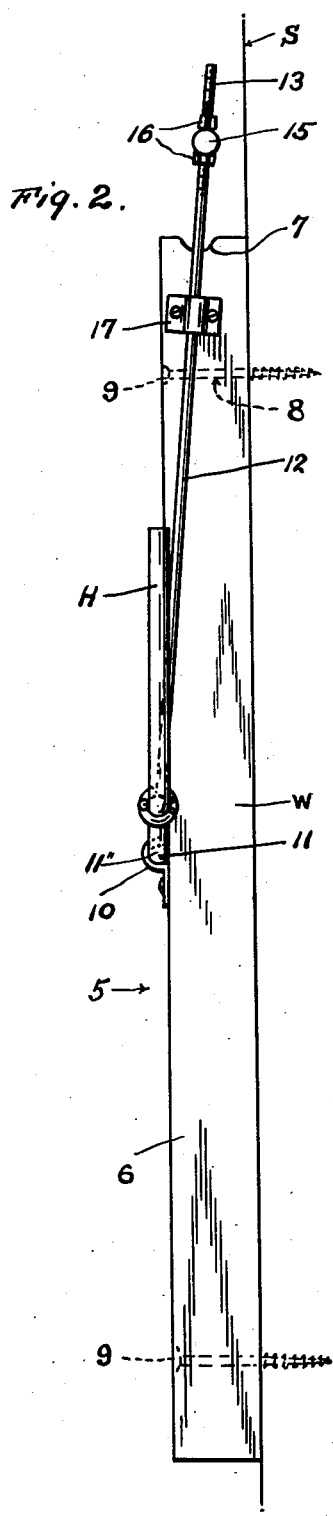
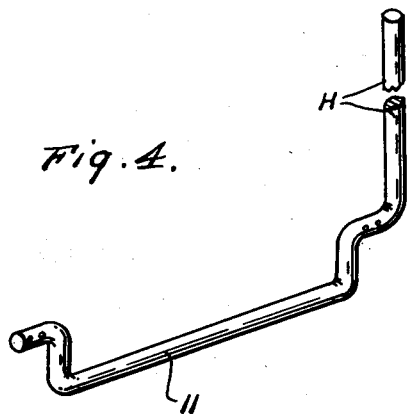
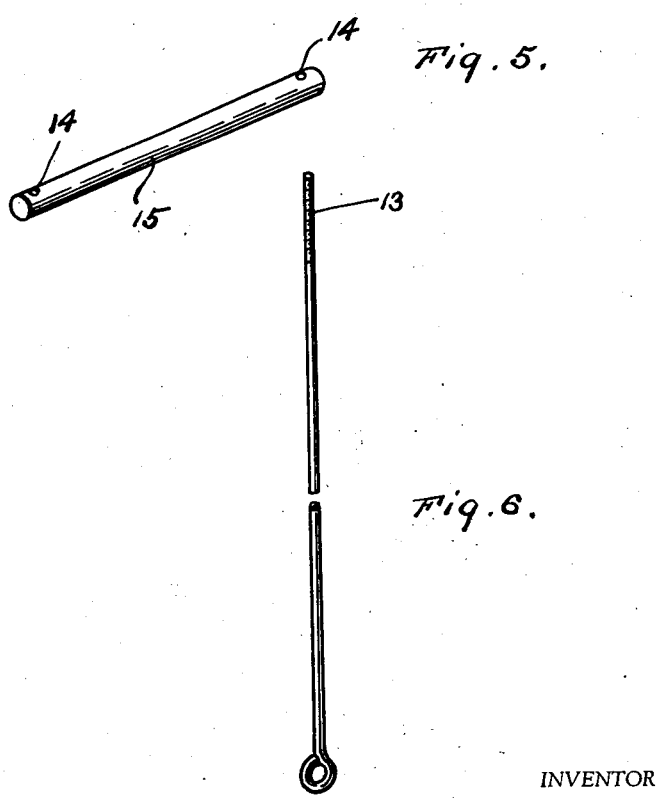
INVENTOR
Robert L. Holton
BY L. B. James
ATTORNEY Patented Sept. 16, 1952

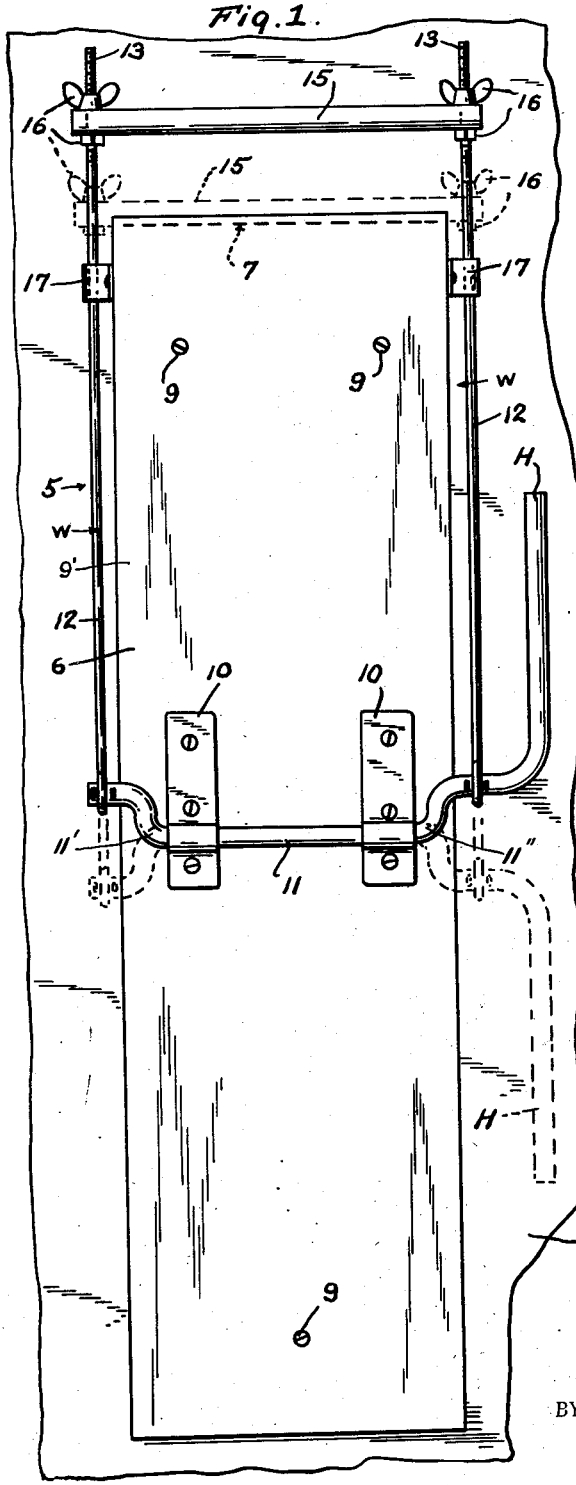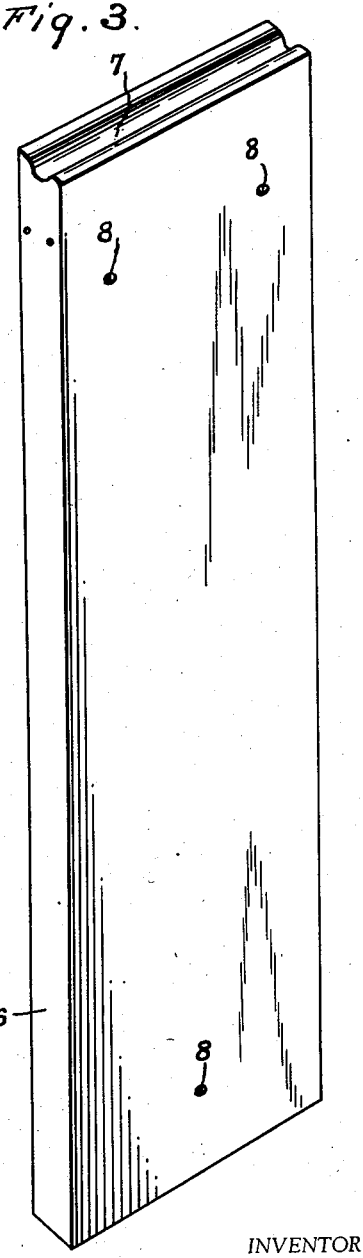

2,610,356

UNITED STATES PATENT OFFICE 2,610,356

GAME SKINNING RACK

Robert L. Holton, Beggs, Okla.

Application September 20, 1949, Serial No. 116,805

4 Claims. (Cl. 17—8)

This invention relates to the official class of butchering and dressing and more particularly a new and novel game skinning rack.

The primary object of this invention resides in the provision of a skinning rack whereby small game, fish and the like can be dressed by an individual without assistance of others.

Another object of this invention resides in the provision of a skinning rack adapted to be removably secured to a support so as to removably clamp small animals such as squirrels, coons, etc. thereon so they can be easily skinned and dressed by an individual.

A further object of this invention resides in the particular construction of the skinning rack.

With these and other objects in view, this invention resides in certain novel features of construction and arrangement of elements to be hereinafter more particularly set forth in the specification, illustrated in the accompanying drawings and pointed out in the appended claims and, although this disclosure depicts my present conception of the invention, the right is reserved to resort to such departures therefrom as come within the scope of the claims.

In the accompanying drawings forming a part of this application:

Fig. 1 is a front view of the skinning rack.

Fig. 2 is a side view thereof.

Fig. 3 is a perspective view of the base.

Fig. 4 is a perspective view of the crank with a part broken away.

Fig. 5 is a perspective view of the clamp rod on a reduced scale.

Fig. 6 is a perspective view of one of the links on a reduced scale.

In the present illustration of this invention the numeral 5 designates, in general, a small game skinning rack which consists of a suitable base 6 having a laterally extending substantially semi-circular groove 7 formed in its upper end and screw-holes 8 formed at its top and bottom portions to permit it to be secured to a support S by screws 9 or other suitable fastening elements.

Journalled on the front side 9' of the base as by suitable bearings 10 is a crank 11 to opposite ends 11' and 11" of which is secured upwardly and rearwardly extending links 12 having threaded ends 13 passing through holes 14 in opposite ends of a cylindrical clamping rod 15 seated in the aforesaid groove 7 when in clamping position against the feet or other elected portion of the game to be operated on. Said clamping rod is adjusted on the links by nuts 16 or other suitable elements to regulate the pressure on that portion of the animal, fish or suspending element attached thereto when the crank is manipulated to clamping position on the base by a handle H formed on the end 11" of the crank.

In order that the links will retain the clamping rod in opposed position to the groove and seat the same therein when the handle is directed downwardly, suitable guide bearings 17 are disposed on opposite sides W of the base for them to slide through.

Where it becomes necessary to indirectly support an animal, fish or the like against the face of the base, a cord, hook on a cord or the like (not shown) is fastened thereto with its free end secured in the groove by the clamping rod and elements which operate the same.

With this invention fully set forth, it is manifest that a skinning rack is provided which can be conveniently carried by hunters and fishermen and removably attached to a tree or other support and through the simplicity of the cooperative elements thereof, positive operation of the same is assured at all times.

Having thus described my invention, what I claim and desire to protect by Letters Patent is:

1. A skinning rack comprising, a base having a laterally extending groove in its upper end, a crank journalled on the face of the base, a clamping rod seated in the groove and having holes in its opposite ends, links connected to opposite ends of the crank and having threaded upper ends extending through the holes in the clamping rod, nuts threaded on the upper ends of the links at opposite sides of the clamping rod, guide bearings secured to the upper portion of the base and slidably receiving the links, a handle formed on the crank, and screws securing the base to a support.

2. A skinning rack comprising, an elongated substantially rectangular base having a laterally extending substantially semi-circular groove formed in its upper end and screw-holes in its upper and lower portions, guide bearings secured to the opposite sides of the base adjacent its upper end, a cylindrical clamping rod seated in the groove with its opposite ends extending laterally beyond the sides of the base and having holes therein, a crank journalled on the face of the base at a point remote from the groove therein, links pivotally connected to opposite ends of the crank with their outer portions slidably extending through the guide bearing and having threaded ends extending through the holes in the clamping rod, nuts threaded on the upper ends of the links and bearing against opposite sides of the clamping rod, and a handle formed on one end of the crank.

3. A skinning rack comprising, an elongated base having a laterally extending groove formed in its upper end, guide bearings secured to the opposite sides of the base below its upper end, a clamping rod seated in the groove with its opposite end extending laterally beyond the sides of the base, a crank journalled on the face of the base below said bearings, links pivotally connected to opposite ends of the crank and extending diagonally therefrom through holes in opposite ends of said clamping rod with their intermediate portions rockably and slidably extending through said bearings, adjusting means connecting the upper ends of the links to the clamping rod, and a handle formed on the crank.

4. A skinning rack comprising a base having a substantially semi-circular groove extending across its upper end, a cylindrical clamping rod having holes in its opposite ends disposed rearwardly of and opposed to said groove when in inoperative position above the upper edge of the base, a crank journalled on the face of the base and having its opposite ends terminating outwardly of the sides of the base, diagonally extending links pivotally connected to the opposite ends of the crank and having threaded upper ends extending through the holes in the clamping rod, said links being disposed in close proximity to the sides of the base, diagonally disposed guide bearings secured to the opposite sides of the base adjacent the aforesaid groove therein and slidably receiving upper portions of the links, and a handle formed on one end of the crank outwardly of the adjacent link.

ROBERT L. HOLTON.

REFERENCES CITED

The following references are of record in the file of this patent:

UNITED STATES PATENTS

| Number | Name | Date |
|---|---|---|
| 1,241,768 | Rush | Oct. 2, 1917 |
| 1,350,713 | Ferdon | Aug. 24, 1920 |
| 1,381,855 | Ashcraft | June 14, 1921 |
| 1,390,105 | Erwin | Sept. 6, 1921 |
| 1,613,354 | Mathes | Jan. 4, 1927 |
| 1,652,102 | Elmer et al. | Dec. 6, 1927 |